United States Patent
McBeth Pool et al.

(10) Patent No.: US 9,633,571 B2
(45) Date of Patent: Apr. 25, 2017

(54) ART INSTRUCTION SYSTEMS AND METHODS USING A BORDER GUIDE

(76) Inventors: Susan McBeth Pool, Marshall, TX (US); Alaina N. Pool Jones, Marshall, TX (US); Alan R. Loudermilk, Marshall, TX (US)

( * ) Notice: Subject to any disclaimer, the term of this patent is extended or adjusted under 35 U.S.C. 154(b) by 0 days.

(21) Appl. No.: 13/199,819

(22) Filed: Sep. 9, 2011

(65) Prior Publication Data

US 2013/0065201 A1    Mar. 14, 2013

(51) Int. Cl.
*G09B 11/00* (2006.01)
*G09B 19/00* (2006.01)

(52) U.S. Cl.
CPC ............ *G09B 19/00* (2013.01); *G09B 11/00* (2013.01)

(58) Field of Classification Search
USPC ......................................... 434/81, 90, 97, 98
See application file for complete search history.

(56) References Cited

U.S. PATENT DOCUMENTS

| | | | |
|---|---|---|---|
| 228,273 A * | 6/1880 | Peabody | 33/277 |
| 464,359 A * | 12/1891 | Hagan | 33/1 R |
| 1,554,211 A * | 9/1925 | Halevy | 248/464 |
| 1,992,083 A * | 2/1935 | McDonald | 434/90 |
| 2,626,467 A * | 1/1953 | Abbott | 434/81 |
| 3,114,215 A * | 12/1963 | Turkin | 248/449 |
| 3,599,925 A | 8/1971 | Dubler | 248/452 |
| 3,939,564 A * | 2/1976 | Slawinski, Sr. | 33/1 K |
| 4,001,941 A | 1/1977 | Cruz | 33/1 |
| 4,181,046 A * | 1/1980 | Lamb | 81/487 |
| 4,971,284 A * | 11/1990 | Curry | 248/460 |
| 5,273,248 A * | 12/1993 | Grander | 248/460 |
| 5,393,030 A * | 2/1995 | Tarozzi | 248/460 |
| 5,513,991 A * | 5/1996 | Reynolds et al. | 434/81 |
| 5,673,490 A | 10/1997 | Hill | 33/1 |
| 6,568,938 B1 * | 5/2003 | Prince et al. | 434/90 |
| 6,579,099 B1 | 6/2003 | Pipes | 434/85 |
| 6,601,805 B1 | 8/2003 | Kapp | 248/171 |
| 6,772,532 B1 * | 8/2004 | Honea | 33/759 |
| 7,389,589 B2 * | 6/2008 | Debold | 33/1 B |
| 7,464,480 B2 * | 12/2008 | Vetromila | 33/436 |

(Continued)

OTHER PUBLICATIONS

McArdle, Thaneeya, "the grid method", accessed at: http://www.art-is-fun.com/grid-method.html, Feb. 13, 2009.*

(Continued)

*Primary Examiner* — James Hull
(74) *Attorney, Agent, or Firm* — Loudermilk Associates

(57) ABSTRACT

Improved systems and methods using a border guide and/or border guide easel that enables art instruction in a relatively low cost and simple to use manner suitable for group or individual instruction of a relatively sophisticated nature. A scaled border guide preferably labeled with numbers and letters provides a virtual coordinate or reference system that enables artists to locate multiple random points on the surface to be painted. A physical grid or stencil or the like are not used on the artist's surface. The scaled border lines are used to define a virtual grid on the artist's working surface that may be used to indicate reference, points, positions, sizes and shapes for drawing or painting. Art instruction methods allow the teaching of drawing and painting in a more classical and relatively sophisticated style as compared to paint-by-numbers or grid art.

9 Claims, 16 Drawing Sheets

(56) References Cited

U.S. PATENT DOCUMENTS

| | | | | |
|---|---|---|---|---|
| 7,513,773 | B1* | 4/2009 | Oakes et al. | 434/91 |
| 7,581,333 | B2* | 9/2009 | Dressler | 33/758 |
| 7,926,188 | B2* | 4/2011 | Thorkelson | 33/1 K |
| 8,002,550 | B1* | 8/2011 | Robinson | 434/90 |
| 2003/0035915 | A1* | 2/2003 | Schnoebelen, Jr. | 428/40.1 |
| 2004/0142306 | A1* | 7/2004 | Prince | 434/85 |
| 2005/0257393 | A1* | 11/2005 | Spanski et al. | 33/758 |
| 2007/0271806 | A1* | 11/2007 | Dressler | 33/758 |
| 2007/0283589 | A1* | 12/2007 | Garcia | 33/758 |
| 2011/0156381 | A1* | 6/2011 | Kuo et al. | 281/30 |
| 2011/0168827 | A1* | 7/2011 | Cooper | 242/160.4 |

OTHER PUBLICATIONS

Jules, "Peacock Painting and Ruler Frame", accessed at: http://orignauxmoose.com/art-design/peacock-painting-ruler-frame/ (Apr. 10, 2008).*

* cited by examiner

ART INSTRUCTION SYSTEMS AND METHODS USING A BORDER GUIDE

FIELD OF THE INVENTION

The present invention relates to tools and methods used in art instruction and creating works of art. More particularly the present invention relates to border grid and easel systems and methods used to instruct students in the creation of artwork.

BACKGROUND OF THE INVENTION

There is a widespread desire to create works of art such as paintings, including by persons having little or no formal art training. Numerous techniques and implements for aiding in art instruction have been attempted over the years and generations with varying levels of success. Such techniques and implements often focus on children or are otherwise limited in their level of sophistication. More recently, a desire has been seen to provide art instruction to adults or children desiring more sophisticated art instruction oftentimes in a party setting that combines desirable recreation with a level of art instruction targeted to such participants. The goal of such art instruction, for example, may be to enable participants to complete a work of art in a defined period of time such as two or three hours.

The proliferation of art parties for children or adults as a mode of entertainment combined with art instruction exemplifies this trend. Art parties can provide a social setting along with art instruction. Such environments for art instruction have created the need for relatively simple methods of art instruction with a level of sophistication that is suitable for participants that desire more than a paint-by-numbers experience. Ideally, the art instruction results in artwork that, for example, depicts a reasonable likeness of a desired scene or image used in the art instruction, with depth or creating the appearance of the actual three dimensional object.

Art instruction may occur at various locations and group settings depending on the participants and instructors and available facilities. In such circumstances, any equipment and supplies may need to be transported and provided by the host or the person or entity providing the art instruction. Participants may include children and adults, and typically most participants do not have formal training in the creation of artwork. Using an art party as an example, a relatively large group of participants may gather for art instruction with the goal of producing a work of art in a more or less defined period of time, such as about two to three hours. This may be the first art instruction many participants have encountered. The goal of art instruction in such as setting generally is to provide participants with an enjoyable social environment facilitated by a host who is knowledgeable in art instruction. Participants expect to enjoy the time spent with other people and at the same time create a recognizable or desirable piece of artwork in a stress-free fun atmosphere. The system and methods used by the host need to be easily understood, simple to set up, compact for transporting between various locations, while at the same time providing more sophisticated art instruction than paint-by-numbers.

There are many techniques used in art instruction ranging from simplistic paint-by-numbers to instruction of shapes, shading, tone, etc. Art grids or "squaring" are commonly used in art instruction for creating an accurate perspective likeness of shapes or source images. Squaring or gridding generally involves subdividing a source image into a number of squares that individually relate to destination squares drawn or projected onto a canvas or other art medium. Often the sizes of squares are used to create different proportional sizes of source images. The grid method relative to art instruction involves the location of a point or area on the canvas surface referenced by a set of coordinates using the horizontal and vertical axes. Various types of art grids are known in prior art; however, such known techniques possess limitations making them impractical or ineffective for the purpose of art instruction in settings such as described above, and tend to produce flat, two dimensional appearances.

One known technique involves an alignment mechanism and is disclosed in U.S. Pat. No. 5,673,490. This technique relates to a grid system printed on a static cling vinyl or other similar material, and is used with a light source to aid in the positioning, tracing and alignment of art projects. The use of light boxes for the purpose of group art instruction or art parties generally is cost prohibitive and inconvenient for transporting equipment and supplies for a large group or novice individuals.

Another known technique is the drawing aid described in U.S. Pat. No. 6,568,938. This patent discloses a series of detailed image guides, corner guides, canvas tables, a scaled ruler for marking canvas grids, and pre-gridded canvases or back-shadowing transparencies for placing behind canvases and illuminating from the back, which may require the canvas to be transparent enough to pass light. This patent also discloses computer generated graduated image-guides using a software program. When canvases are gridded, the grid is quickly covered with one layer of paint, such as background coloring or underpainting. Once the grid is covered, it is no longer usable for providing additional instruction or details for the artwork. The use of illumination and computer generated aids generally are cost prohibitive in particular for a group setting, logistically impractical for transporting, and ineffective in a group art instruction environment.

Another known technique is the freehand drawing training and guiding device disclosed in U.S. Pat. No. 6,579,099. This techniques includes a device consisting of a series of sighting grid plates through which a subject to be drawn is viewed, a series of grid transfer stencils used to set a similar grid on the canvas or paper media. With such techniques, the artist is tracing and not drawing it by themselves. While the grid transfer stencils may be removed after use, transfer stencils generally limit the art instruction and/or tend to leave artifacts in the work, and also tend to require disposal or cleaning, which generally are undesirable for art instruction in group settings such as described above. Another disadvantage is that a different stencil typically is required for each painting, either requiring a large number of stencils or a reduced number of paintings.

Another disadvantage of some known grid art techniques is that reference is made to squares as opposed to points, which limit the fineness and sophistication of the instruction and painting that is provided.

Additionally, there are limitations with known, traditional collapsible portable easels. Various easels are known in the art, including the commonly used collapsible art easel disclosed in U.S. Pat. No. 6,601,805. There are also known tabletop easels such as the portable dual easel disclosed in U.S. Pat. No. 3,599,925. Traditional easels such as these generally are limited to one artist, and additional equipment such as tables are needed for tabletop easels. Space is often limited when conducting group art instruction such as with an art party. An art party may take place in a home, office, or outdoor venue typically not originally designed for art instruction. The host or instructor of the art party often must bring all supplies and equipment needed to conduct the event. A two-sided collapsible standing easel, adapted for use with border guides as described herein, would be advantageous in accommodating more participants within a smaller space. The disadvantages to existing art easels include limitations to one participant, the added requirements for tables, may require unstable placing of tarps or the like over a substantial area and under furniture, etc., and a lack of compact storage of supplies within the easel compartment for storage and transport, and inability to accommodate border grids/guides as described herein.

In short, such prior techniques tend to have various disadvantages and limitations, particularly in group and/or mobile art instruction (such as an art party), in which relatively sophisticated yet practical art instruction techniques can be provided in a group setting, with the participants producing a desirable work of art within a relatively predetermined time period.

SUMMARY OF THE INVENTION

The present invention is directed to systems and methods using a border guide and/or border guide easel or frame that enables art instruction in a relatively low cost and simple to use manner suitable for group or individual instruction of a relatively sophisticated nature. A scaled border guide preferably labeled with numbers and letters provides a virtual coordinate or reference system that enables artists to locate multiple random points on the surface to be painted (herein, the surface on which paint or other pigment is to be applied is often referred to as the art medium or media in the plural). The present invention desirably does not use a physical grid or stencil or the like on the artist's surface. The scaled border lines are used to define a virtual grid on the artist's working surface that may be used to indicate reference positions, sizes and shapes for drawing or painting. The present invention allows the teaching of drawing and painting in a more classical and relatively sophisticated style as compared to paint-by-numbers or "grid art". Artists, for example, are able to paint layer over layer while not destroying or covering the original coordinate system.

The use of an border art guide on the outside of a canvas or other medium in effect defines a virtual grid within the working area of the medium that is free of obstruction and other limitation. The border grid allows the artist to maintain access to a grid guide without limiting the use of background painting, shading, and blending of layers.

In accordance with the present invention the numbered and lettered guides are placed on the periphery or border outside of the working area of the canvas or other art medium. In a preferred embodiment, two preferably lettered guides are placed along two parallel sides and two preferably numbered guides are placed along the other two parallel sides. The use of lettered guides for the first axis or direction and the use of numbered guides for the second axis or direction has been determined to be more intuitive and relatively easy to explain to non-technical participants in the art instruction. The placement of the guides on the edge outside of the working area of the canvas or other medium helps to ensure the guide is not covered with paint or other media while remaining visible to the instructor and student. This provides the basis of a coordinate system which the instructor uses for giving directions to the student (the terms "students" and "participants" often being used interchangeably herein).

Systems and methods in accordance with the present invention preferably provide spacing between numbers and letters that are equal. Preferably, this spacing is one inch, although this is exemplary. For example, a canvas size of 16×20 might have two guides labeled one through twenty and two lettered guides labeled A though P. In alternative embodiments, other spacings are utilized, such as a two inch spacing. What is important is that the spacing be suitable for the instructor, student, size of canvas or other medium, desired level of detail in the artwork, etc., and that the reference system provided by the guides enable the location of points in the working area of the art medium.

Systems and methods in accordance with the present invention desirably provide the instructor with a coordinate system for which any point on the canvas can be communicated to the student from start to finish, or as far along in the process as the instructor may desire. This coordinate system ensures a common understanding among all participants or students as well as consistency in resulting artwork products.

In accordance with preferred embodiments, systems and methods preferably include a framework or structural implement on which numbered and lettered guides are securely held in place during the period of art instruction. Preferably, the guides are removed after completion of the artwork for disposal. Optionally, the guides may be produced in such a way as to allow re-use of the guides (e.g., after separation from the medium and removal of any paint that may have been spilled on the guide during art instruction).

Accordingly, it is an object of the present invention to provide border guide or grid and easel systems and methods for art instruction. In accordance with the present invention, low-cost and easy-to-use systems and methods for art instruction are provided that enable relatively sophisticated art instruction that is free from obstructions or limitations in the working area of the art medium.

It further is an object of the present invention to provide border guide or grid systems and methods for using coordinates in art instruction. In accordance with the present invention, a virtual grid may be created within the working area of the art medium that serves as a teaching reference system.

It is yet another object of the present invention to provide border guide/grid systems and methods for art instruction with virtual points of reference which can be used throughout the creation of an artwork, and then be removed for disposal or cleaning.

Finally, it is an object of the present invention to provide systems and methods preferably including a two-sided collapsible easel with framework for border guides/grids of the present invention.

BRIEF DESCRIPTION OF THE DRAWINGS

The above objects and other advantages of the present invention will become more apparent by describing in detail exemplary preferred embodiments of the present invention with reference to the attached drawings in which.

DETAILED DESCRIPTION OF THE PREFERRED EMBODIMENTS

The present invention will be described in greater detail with reference to certain preferred and alternative embodiments. As described below, refinements and substitutions of the various embodiments of the present invention are possible based on the principles and teachings herein.

In accordance with the present invention, relatively easy to use, low cost, and disposable or reusable border guide or grid systems and methods for facilitating art instruction are provided. Exemplary preferred embodiments of the present invention will now be described.

Figure 1A:
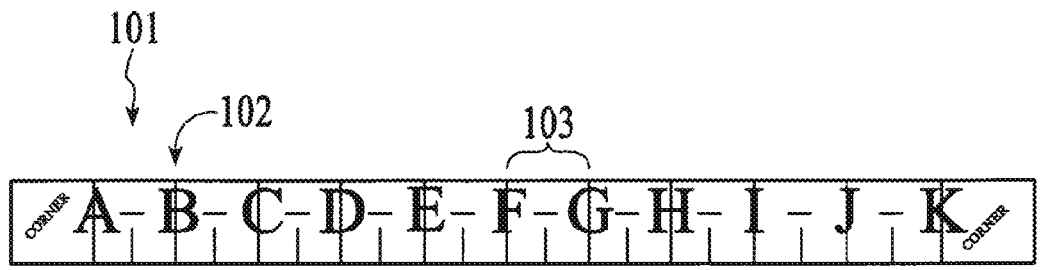
FIGS. 1A-1D illustrate preferred embodiments of components of guides used in art instruction in accordance with the present invention.
Figures 1B, 1C:
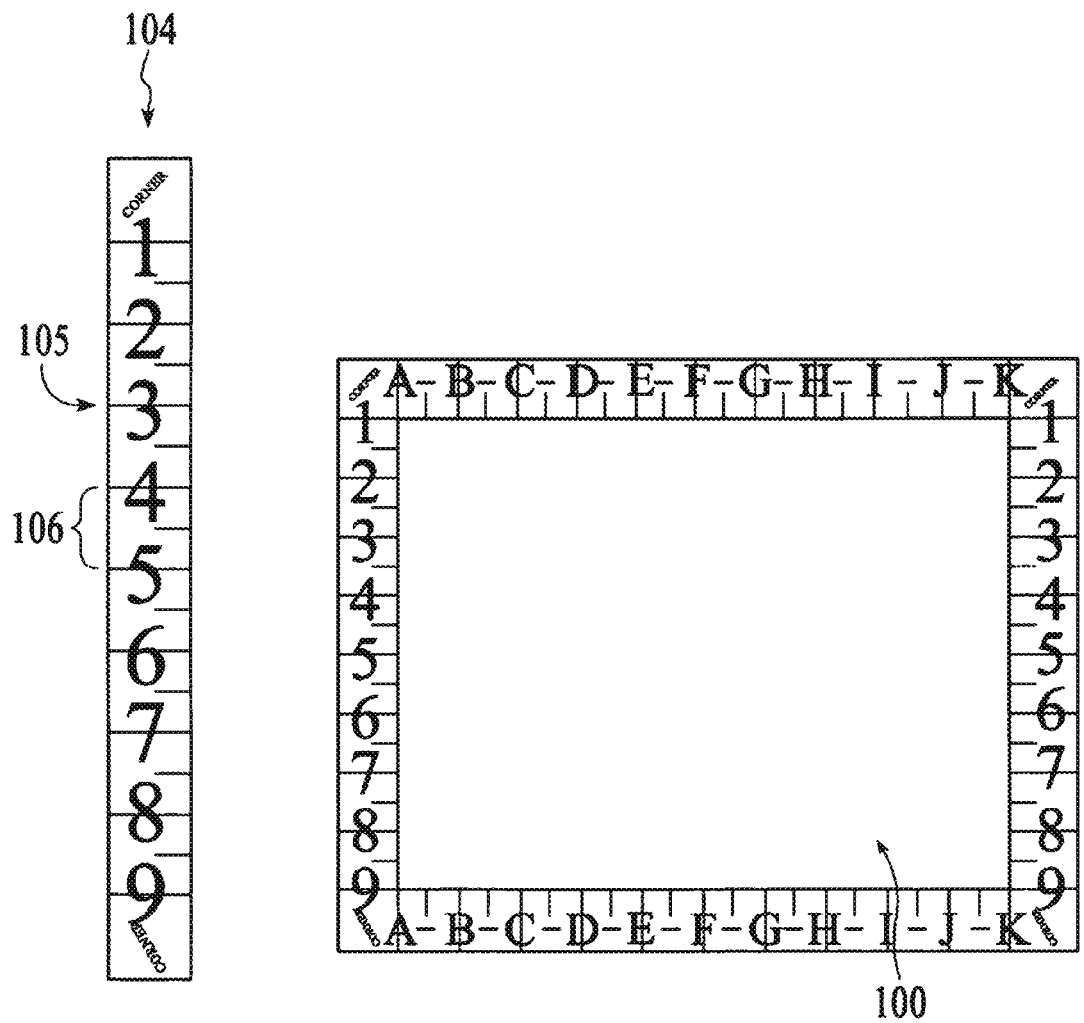

FIGS. 1A, 1B, and 1C illustrate the system in accordance with a first preferred embodiment of the present invention. As illustrated in FIG. 1A, lettered guides 101 preferably are placed along each of the top and bottom of the outside of a canvas or other art medium (typically outside the working area of the canvas or other art medium). Letters 102 preferably are spaced an equal distance apart as denoted by 103. As illustrated in FIG. 1B, numbered guides 104 preferably are placed along each of the left and right sides on the outside of a canvas or other art medium. Numbers 105 preferably are spaced an equal distance apart as denoted by 106, which preferably is also equal to the spaces between letters on letter guides 101. This standard distance in preferred embodiments is one inch or two inches; however, this distance may vary depending on the size of canvas or other art medium. FIG. 1C illustrates guides 101 and 104 placed around canvas or art medium 100.

As will be understood from the foregoing, guides 101 and 104 are positioned to define a grid border outside of the working area of canvas or art medium 100. Guides 101 and 104 in effect define a virtual grid within the working area of canvas or art medium 100 that is free of obstruction or limitation, while enabling the art instructor or instruction manual to reference points, areas, shapes, etc. in the working area of canvas or art medium 100. As will be explained in greater detail hereinafter, art instruction methods using the virtual grid in effect defined by guides 101 and 104 may be desirably provided that enable, for example, group or individual art instruction of a sophistication that exceeds paint-by-number type painting.

As will be appreciated, in a setting such as group or individual art instruction, students will tend to spill or drip paint outside of the working area of canvas or art medium 100. Border guides preferably are flush or close to the surface to facilitate accurate points of reference. Once guides 101 and 104 become covered or splattered with paint or other art medium, they tend to be no longer legible and therefore no longer useful (which may be after the first or multiple uses depending on how much over paint is placed outside the canvas or art surface). One option is to create these guides on a material which can be cleaned. For example, guides 101 and 104 may be implemented by permanently affixing (permanent inking, painting, embossing, stamping, engraving, etc.) on the surface of a frame structure and made of wood or other suitable material. Guides 101 and 104 could be of a unitary or multi-piece (e.g., two piece or four piece) construction and held in place with a pressure fit relative to canvas or art medium 100, or be held in relative position by a non-permanent adhesive or bracket or other connecting implement to the edges of canvas or art medium 100. What is important is that guides 101 and 104 may be securely positioned relative to the working area of canvas or art medium 100 to visibly provide the border guides during the desired period of art instruction, and thereafter be removed for cleaning and re-use.

In the context of, for example, group art instruction, a disposable border guide system has certain advantages. For example, if there are a large number of participants, an increased number of border guides would need to be cleaned after use, and of course there is the possibility that these guides will need to be replaced or cleaned during an art instruction session. Thus, in certain preferred embodiments, disposable guides are advantageously provided in accordance with the present invention. In accordance with such preferred embodiments, the guides preferably are printed onto a continuous roll with a light adhesive, magnetic, or Velcro (Velcro is believed to be a trademark of Velcro Industries B.V.) backing such that one letter or number guide can easily be removed and attached to a surface that enables the guides to be positioned on the border of the working area of canvas or art medium 100. The removable backing enables the guides to be easily placed in the border around canvas or art medium 100 and useful during the period of art instruction, and then removed for disposal. The type of removable backing is not critical. What is important is that the border guides be easy to apply to the peripheral region of the working area of the canvas or other medium, and be removably securable so that the border guides are present during the desired period of art instruction but removable thereafter, preferably for disposal.

Figure 2A:
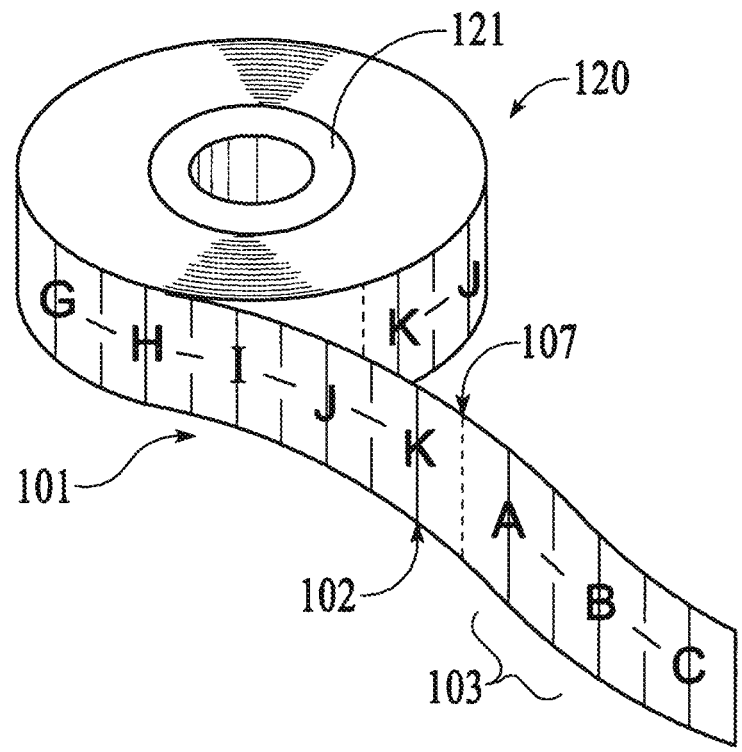
FIGS. 2A and 2B illustrate a preferred embodiment of a continuous roll of the guides in accordance with the present invention.
Figure 2B:
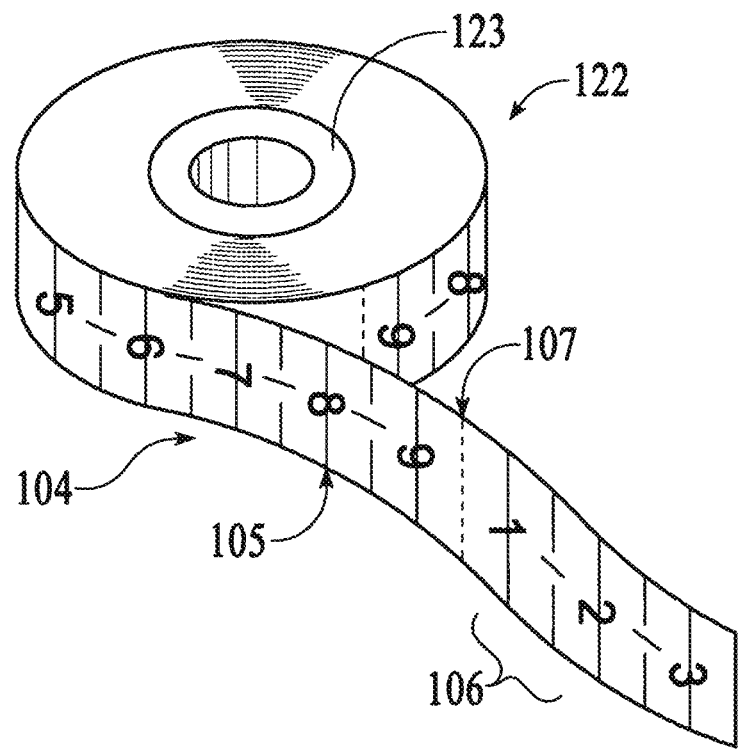

FIGS. 2A and 2B illustrate, in one exemplary preferred embodiment, lettered and numbered guides 101 and 104 respectively manufactured on continuous rolls 120 and 122, respectively. FIG. 2A illustrates an exemplary continuous roll 120 of letter guide 101 wound around core 121. In the illustrated embodiment, letter guide 101 begins with a corner region, then A, then B, . . . and ends with K (which may extend to any letter or letters depending on the spacing of the lines and size of medium), followed by another corner region. The number of letters will be dependent on the size of canvas or art medium. In the illustrated embodiment perforation 107 between two regions as illustrated allows for easily removing one of the letter guides 101 from continuous roll 120 so as to be removed and positioned along the top and bottom of canvas or other art medium 100, as described elsewhere herein. In the illustrated embodiment, the use of regions proximate to perforation 107 may facilitate placement of guide 101 in the desired border location of canvas or art medium 100 (see also, e.g., FIGS. 1A to 1C). It should be understood, however, that the style and orientation of numbers, the lines and markings (e.g., lines, half lines, dashes, etc.), location and direction of perforation(s) are exemplary and variations of what has been illustrated are within the scope of the present invention.

Similarly, FIG. 2B illustrates continuous roll 122 of number guide 104 wound around core 123. In the illustrated embodiment, number guide 104 begins with a corner region, then 1, then 2, . . . and ends with 7, followed by another corner region. Numbering will depend on the size of canvas or art medium. In the illustrated embodiment, perforation 107 between two squares labeled In the illustrated embodiment, the corner region allows for easily removing one of the number guides 104 from continuous roll 122 so as to be removed and positioned along the left and right sides of canvas or other art medium 100, as described elsewhere herein. The use of a corner region 107 facilitates placement of guide 104 in the desired border location of canvas or art medium 100 (see also, e.g., FIGS. 1A to 1C).

It should be understood, however, that the illustrated letters, numbers, corner regions, perforations are merely illustrative, and other types of arrangements of letters, numbers, corner regions (or no corner regions), symbols, perforations, etc. are used in alternative embodiments. As one alternative embodiment, a series of numbers or letters are provided in total number with the provided spacing that result in a length that will exceed the largest expected height or width of the canvas or other medium. In such an embodiment, the tape may be torn or cut to the appropriate length for the particular canvas or other art medium, with any remainder of the series discarded. With such an embodiment, one or two rolls of tape dispensed guides may be used to provide border guides for an almost arbitrary height or width of canvas or other medium. Still alternatively, numbers, letters or symbols could be printed or inked, etc. to fit specifically for one or a limited number of canvas or other printing surfaces (which could be glass, etc.). All such variations are within the scope of the present invention.

Figure 2C:
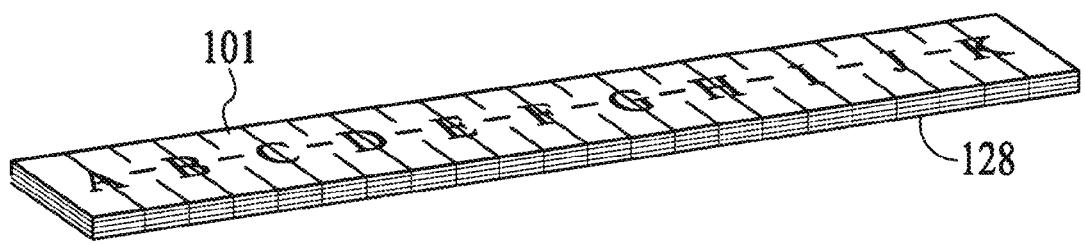
FIGS. 2C and 2D illustrate another preferred embodiments of a pad of the guides in accordance with the present invention.
Figure 2D:
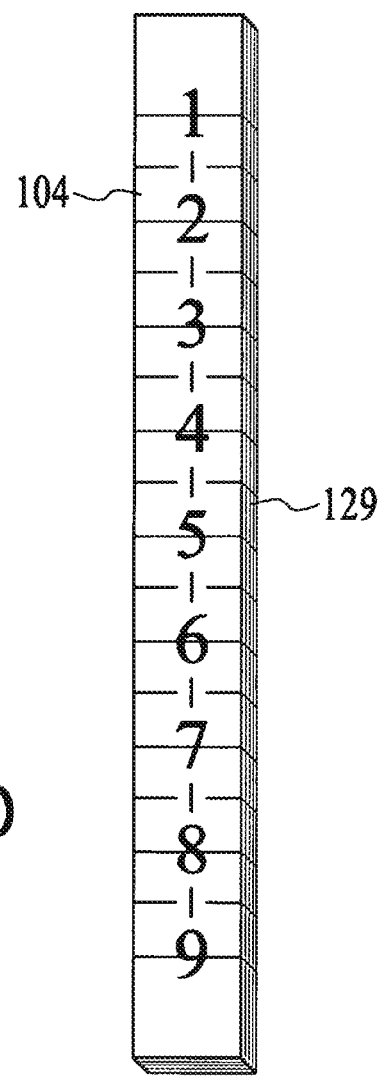

FIGS. 2C and 2D illustrate, in another exemplary preferred embodiment, lettered and numbered guides 101 and 104 respectively are manufactured and dispensed in "sticky-note" pads 128 and 129. As will be appreciated from the description elsewhere herein, such pad-dispensed guides may be applied to the border region of the canvas or art medium and utilized for art instruction as with other disclosed embodiments.

As described elsewhere herein, the border grid/guides of the present invention may be constructed of a frame type structure (with a more or less permanent affixing of the letters and numbers on the frame (which must be cleaned), or of a removable or disposable type structure using a non-permanent adhesive in the form of a continuous roll or a "sticky note" type pad (lightly adhering adhesives may be used such as with sticky notes or masking tape, etc., or other means of adhering such as magnetic, Velcro material or the like) (Velcro is believed to be a trademark of Velcro Industries B.V.). In such removable or disposable embodiments, the guides or grids may be applied to a frame type structure that surrounds the canvas or art medium such as previously described. In accordance with other alternative preferred embodiments, implements are provided for application of the removable or disposable grids/guides which are adapted to attach to the canvas or art medium and be used with a conventional easel, and also an improved easel is provided that includes structure for application of the grids/guides as well as other advantageous features. Such additional preferred embodiments will now be described.

Figure 3:
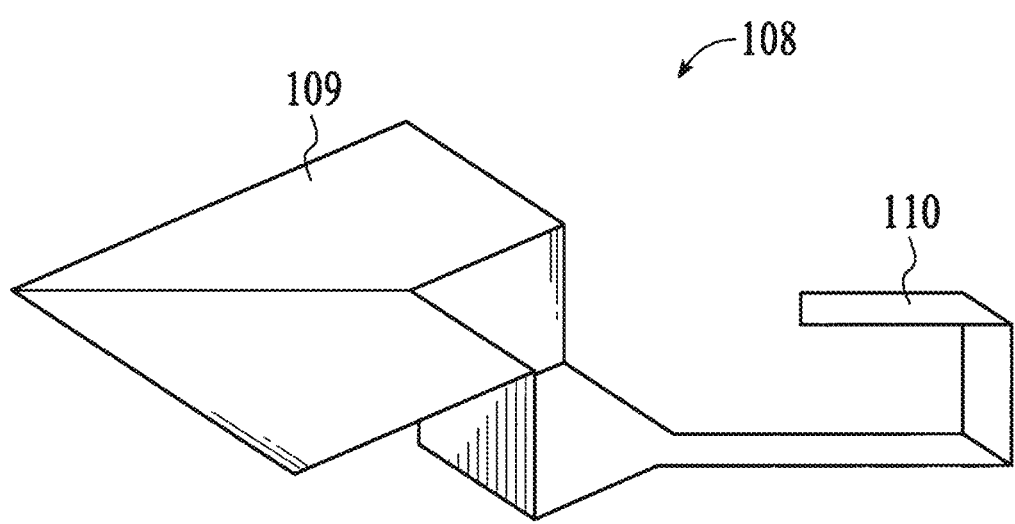
FIG. 3 illustrates an alternative embodiment in which corner plates create a framework for applying guides in accordance with the present invention.

In certain embodiments, existing canvas-type art mediums are utilized. Such canvas-type art mediums typically have a canvas fabric or other material stretched over a wooden or other material frame. Such canvas type medium may come in a variety of sizes. FIG. 3 illustrates corner plate 108 adapted to fit any size canvas having such a frame structure. In accordance with such embodiments, four corner plates are utilized by applying one of corner plates 108 to the four corners of canvas or art medium 100. Corner plate 108 includes hook portion 110 that can attach to the wooden frame on the backside of canvas or art medium 100, so that a corner portion 109 is presented on the corner of canvas or art medium 100. Corner portion 109 serves to provide an area for attachment of the grid/guide tape or pad such as previously described. Alternatively, corner plate 108 can be attached to the frame of canvas or art medium 100 with screws, nails or pins. All variations of how to attach corner plate 108 to canvas or art medium 100 are intended to be within the scope of the present invention. What is important is that that structure be provided to create a framework on which the border grid/guide such as illustrated in FIGS. 2A, 2B and 2C may be attached in the border area of canvas or art medium 100. Corner plates preferably are made out of lightweight metal or plastic and attach to a canvas frame on each corner of the canvas. The corner plate preferably provides a square or other flat surface whereby the corner sections as illustrated in FIGS. 2A, 2B and 2C attach. It also should be understood that the corner plate may extend any length along the top or bottom or sides of the canvas or other working medium. In certain alternative embodiments, the corners extend substantially down the sides and/or top/bottom and may be connected to other corners. In such embodiments, the corners pieces may be coupled together to provide an adjustable outer frame that surrounds the canvas or other art medium and be adapted to fit around various sizes of art medium. Any such type of outer frame that may be adapted to surround a canvas or other type art medium and provide a base or support for application of the border guides are within the scope of the present invention.

FIGS. 4A to 4F illustrate an easel adapted for certain preferred embodiments of the present invention.

Figure 4A:
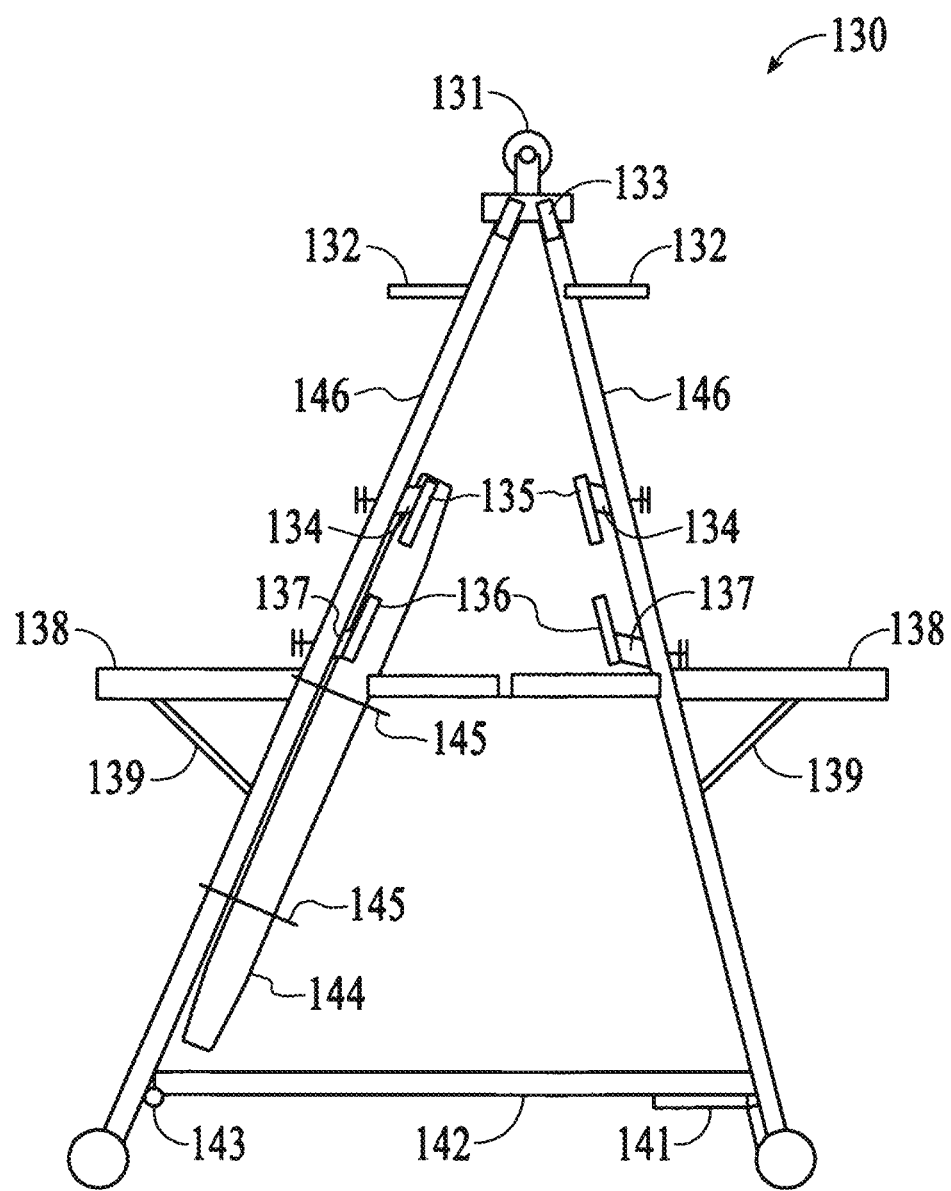
FIGS. 4A-4F illustrate an alternative embodiment in which a framework for applying guides is provided within an easel in accordance with the present invention.

As illustrated in FIG. 4A, in accordance with certain preferred embodiments, easel 130 is adapted for use with the present invention. Main support members 146, horizontal members 137 and fold down shelf 142 (preferably held in place by stop 143 and/or other supports or brackets, etc.) provide the main structural elements of easel 130 in an exemplary preferred embodiment (which may include casters as illustrated, and which may have other conventional hinge or support mechanisms known in the art for such easels). Easel 130 preferably is adapted for two participants to work on opposite sides, with the legs of main support members 146 preferably being adjustable in length to accommodate participants of different heights. The adjustable length may be accomplished by telescoping legs or other suitable implement. Easel 130 also preferably has hinges 133 or other suitable brackets or connecting implements coupling together main support members 146, which may be through a top member as illustrated.

Easel 130 also preferably has other implements to aid in the art instruction and/or to in transporting the easel and related implements to the location of the art instruction. Preferably, easel 130 includes towel holder 131, pallet/glass shelves 138 (preferably supported by braces 139), roll up floor mat 144 (with accompanying hooks 145 or other implement to hold roll up (or folded) floor mat 144 during transportation or when not in use), utility trays 132 for holding brushes or cups (while only one utility tray is shown per side, two or more could be included per side, with one adapted to be a cup holder, etc.).

Figure 4B:
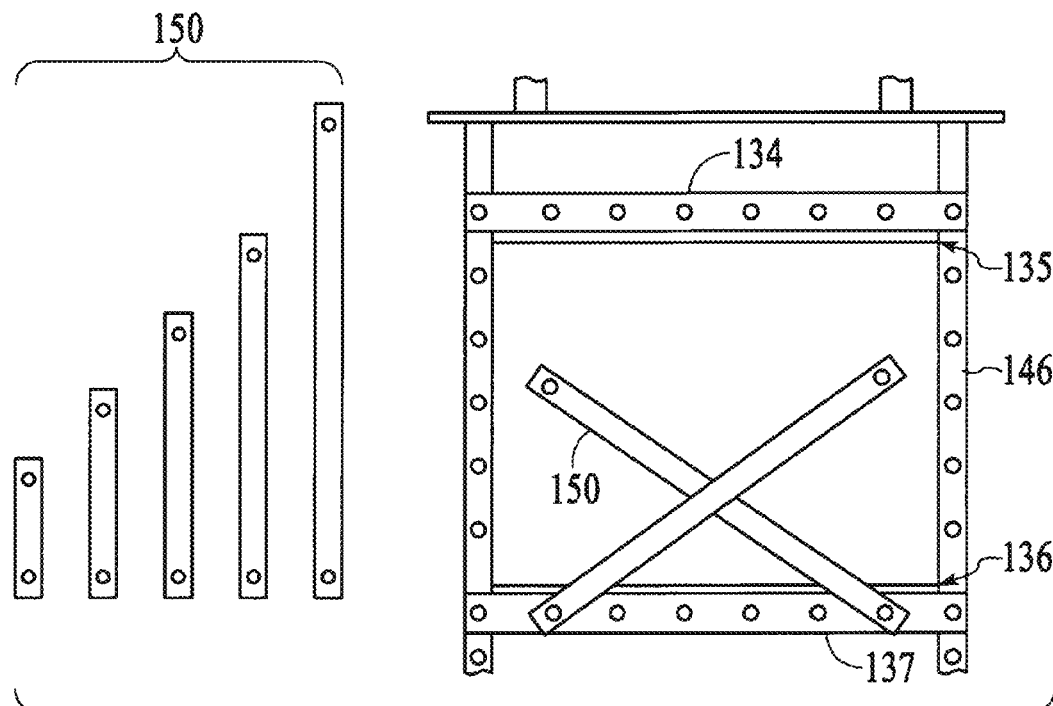

Easel 130 also preferably is adapted to provide an adjustable or varying size frame for the border guide to accommodate different size canvas or other art media, while providing back support for such different size canvas or other media. As illustrated in FIGS. 4A and 4B, canvas backstops 135 and 136 (preferably a light weight horizontal element) are attached to or part of horizontal member 137 and movable horizontal member 134. Canvas backstops 135 and 136 provide back side support for the canvas or other art media. To provide a frame for application of the border guides as described elsewhere herein, several adjustable elements are provided. Referring to FIG. 4B, movable horizontal member 134 may be moved up or down to the desired height to accommodate the height of the particular canvas or other media. While holes are shown as part of main support members 146 and horizontal members 134 and 137 to provide for the adjustment, with pins, screws or other known mechanical implement used to position horizontal member 134 in the desired location, other types of adjusting the height of movable horizontal member 134 are within the scope of the present invention. For example, clips, slots or pressure mechanisms may be used to secure horizontal member 134 in the desired location. What is important is that movable horizontal member 134 can be adjusted up or down and secured in a desired location to accommodate the height of the canvas or other medium being using and provide a frame or support to which the border guide may be affixed.

Figure 4C:
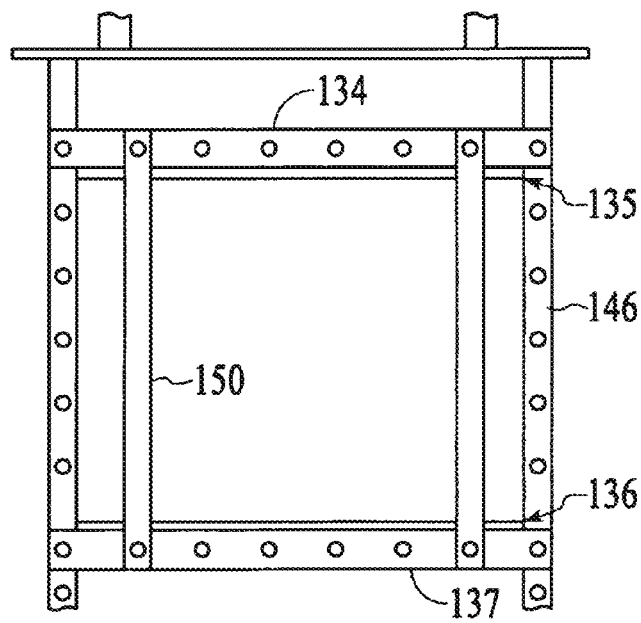

To accommodate different widths of canvas or other media, movable vertical arms are provided. As illustrated in FIGS. 4B, 4C and 4E, vertical arms 150 are provided that can extend from horizontal member 137 to movable horizontal member 134. Differing length vertical arms 150 preferably are provided to accommodate the differing distances between the two horizontal members 134 and 137. In other embodiments vertical arms of a single length are provided that may be removably secured to horizontal members 134 and 137, with any excess length of vertical arms 150 extending above movable horizontal member 134. What is important is that vertical arms 150 be movable and removably securable to horizontal members 134 and 137 to accommodate differing widths of canvas or other art media. As explained previously, while holes are shown as part of horizontal members 134 and 137 and vertical arms 150 to provide for the adjustment, with pins, screws, slots to slide up or down or other known mechanical implement used to position vertical arms in the desired location, other types of adjusting the positions of vertical arms 150 are within the scope of the present invention. For example, clips or pressure mechanisms may be used to secure vertical arms 150 in the desired locations.

Figure 4D:
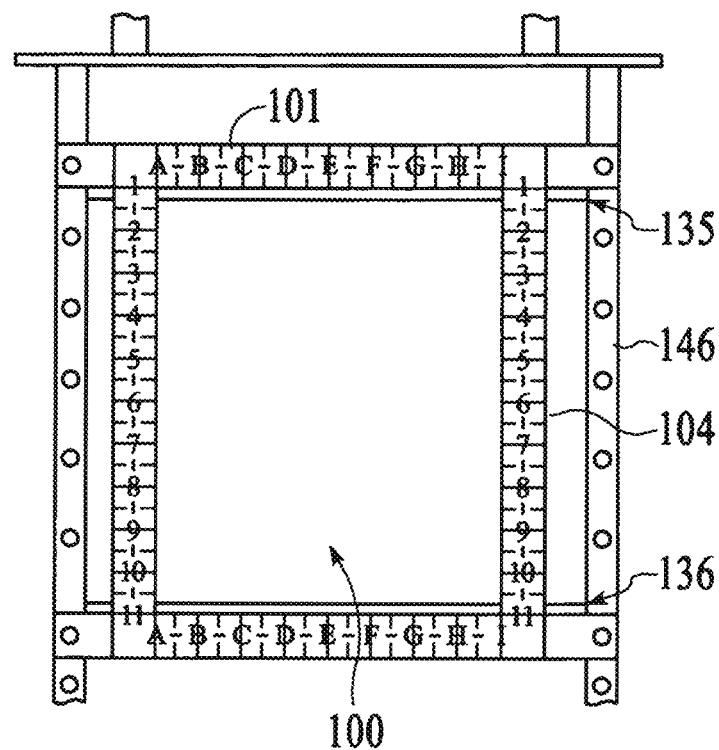
Figure 4E:
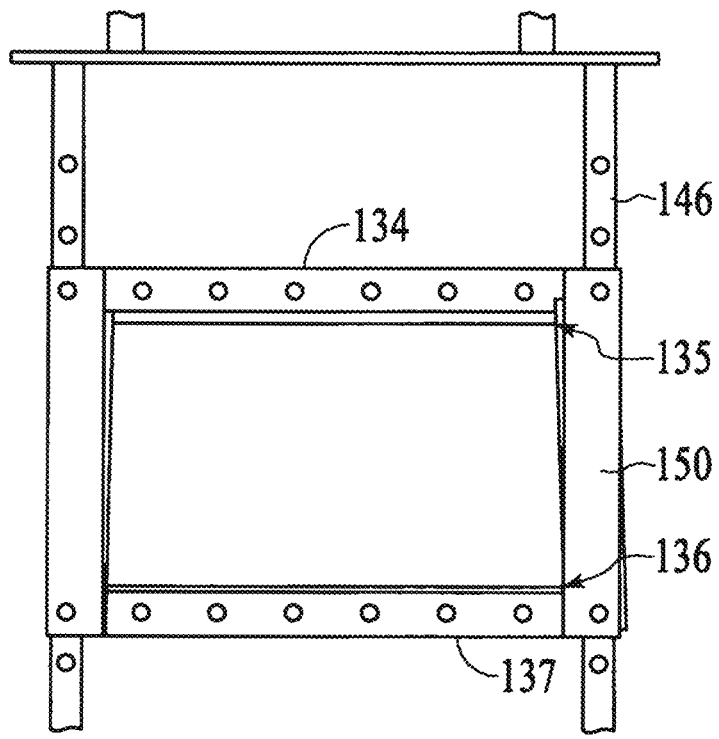
Figure 4F:
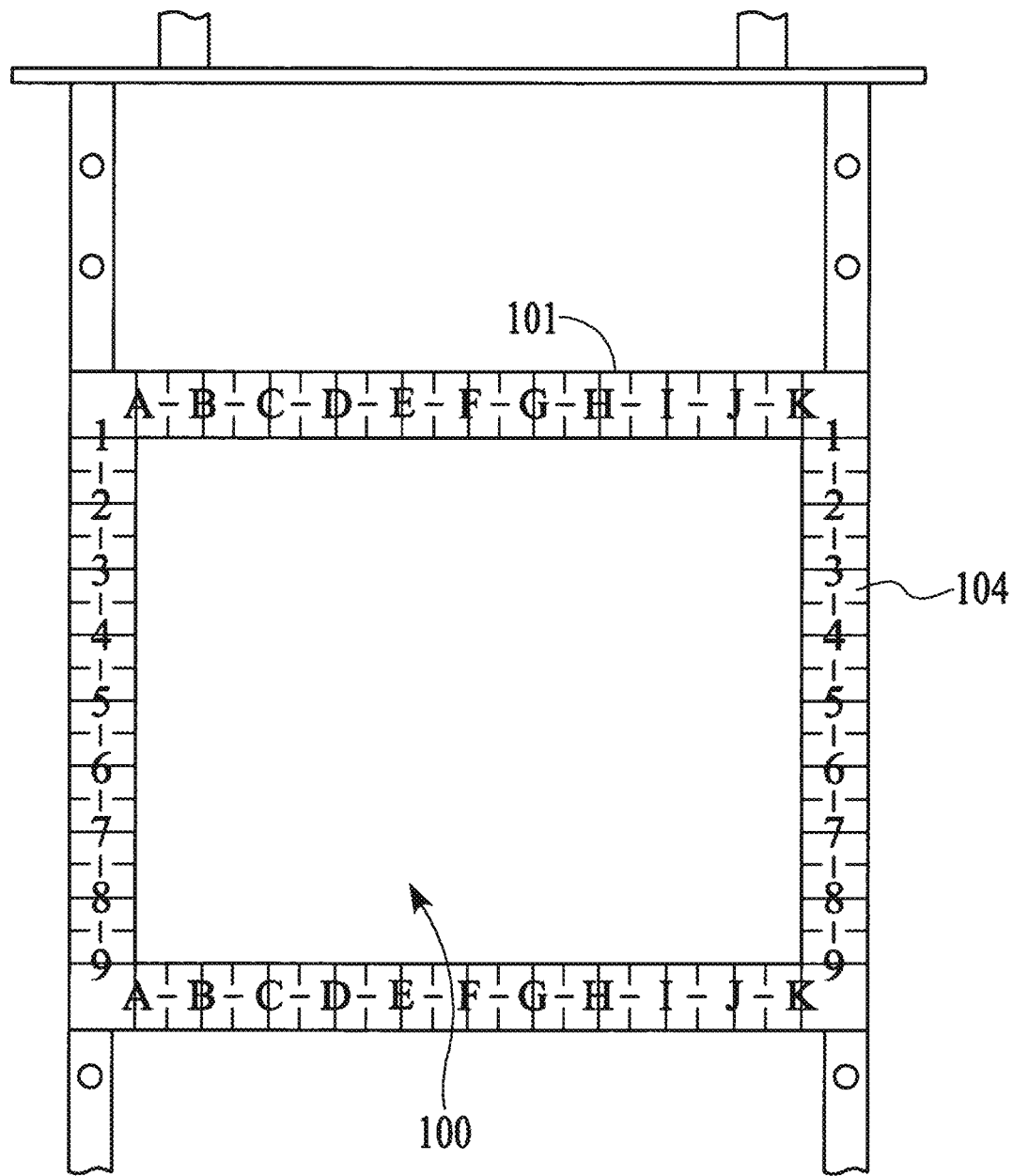

FIGS. 4C, 4D, 4E and 4F illustrate horizontal member 134 and vertical arms 150 being positioned and removably secured to accommodate a more vertical type of canvas or other art medium (FIGS. 4C and 4D) or a more horizontal type of canvas or other art medium (FIGS. 4E and 4F). As illustrated in FIGS. 4D and 4F, horizontal members 134 and 137 and vertical arms 150 accommodate different sizes of canvas or other medium 100, while provided a base, frame or support for border guides 101 and 104.

As also will be appreciated, certain features of easel 130 may be duplicated, as appropriate, to provide the same features to both sides of the easel (although it should be understood that a single sided and/or table easel is within the scope of the present invention).

Figure 5A:
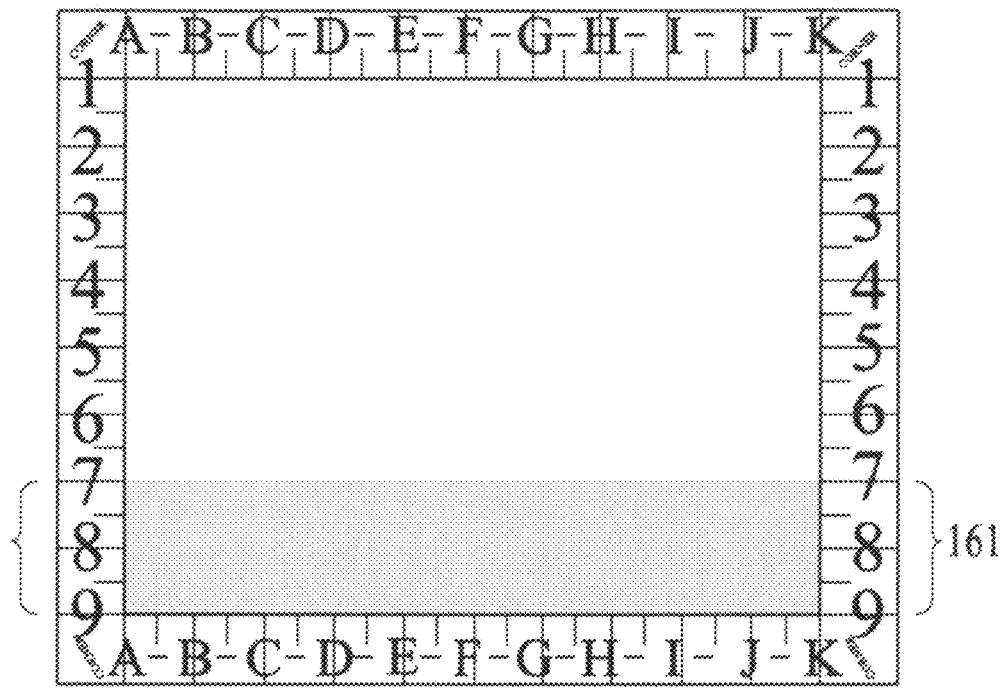
FIGS. 5A-5N illustrate preferred embodiments of the use of the guides in art instruction.

In accordance with the present invention, novel methods for art instruction are provided. Exemplary preferred embodiments of such art instruction methods in accordance with the present invention are illustrated in FIGS. 5A-5N.

The coordinate system provided by the border grids/guides as described elsewhere herein provide the basis of directives provided by an art instructor or instruction manual. Art instruction or a directive is provided by the instructor or manual for the location preferably using a horizontal and vertical coordinate format. A participant or student uses the guides on the outside of the canvas or art medium to identify the location on the canvas and then proceed with the directive. In preferred embodiments, the guides are located on the outside of the canvas and are replaceable in the event that the numbers and letters become covered with paint or the art media after one or multiple uses.

One exemplary step in accordance with the present invention is underpainting. Underpainting generally is understood as the first layer of color on a painting canvas 1 and is illustrated in seven steps FIG. 5A to FIG. 5F. FIG. 5A illustrates an exemplary first step in underpainting. The art instructor or instruction manual, for example, provides the directive: paint light color paint horizontal across the canvas from 9 to 7; using the number guides to locate the area between 9 and 7 on the canvas (denoted by reference numeral 161).

Figure 5B:
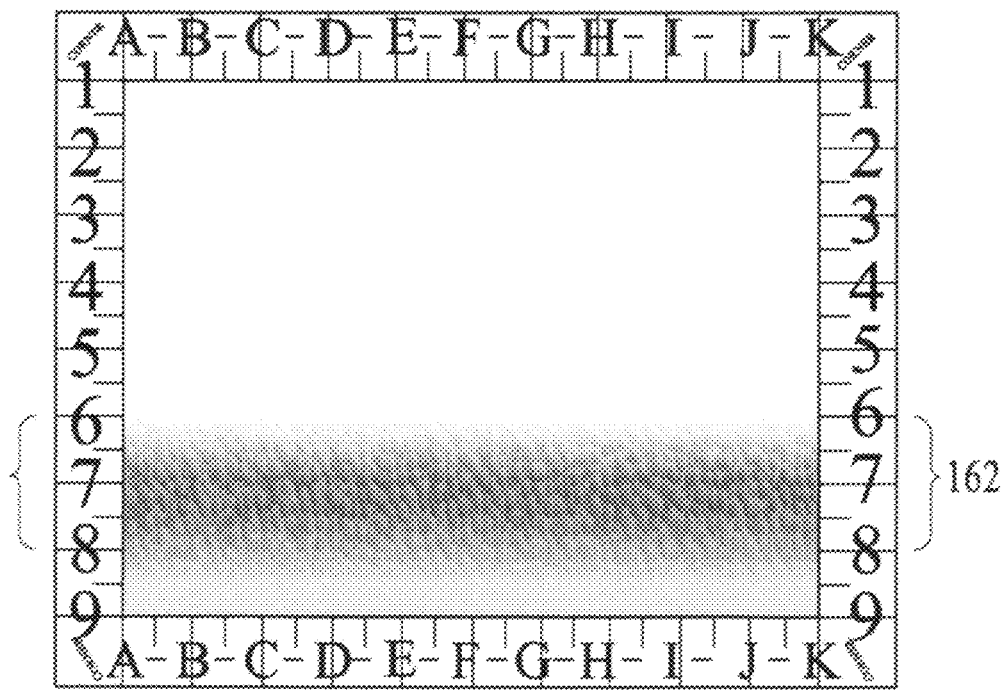

FIG. 5B illustrates an exemplary second step in underpainting. The art instructor or instruction manual, for example, provides the directive: while wet, paint darker color horizontal from 6 to 7; then continue down and blend to 7 and 8; again using the number guides to locate the area between 6 and 7 and 7 and 8 on the canvas (denoted by reference numeral 162).

Figure 5C:
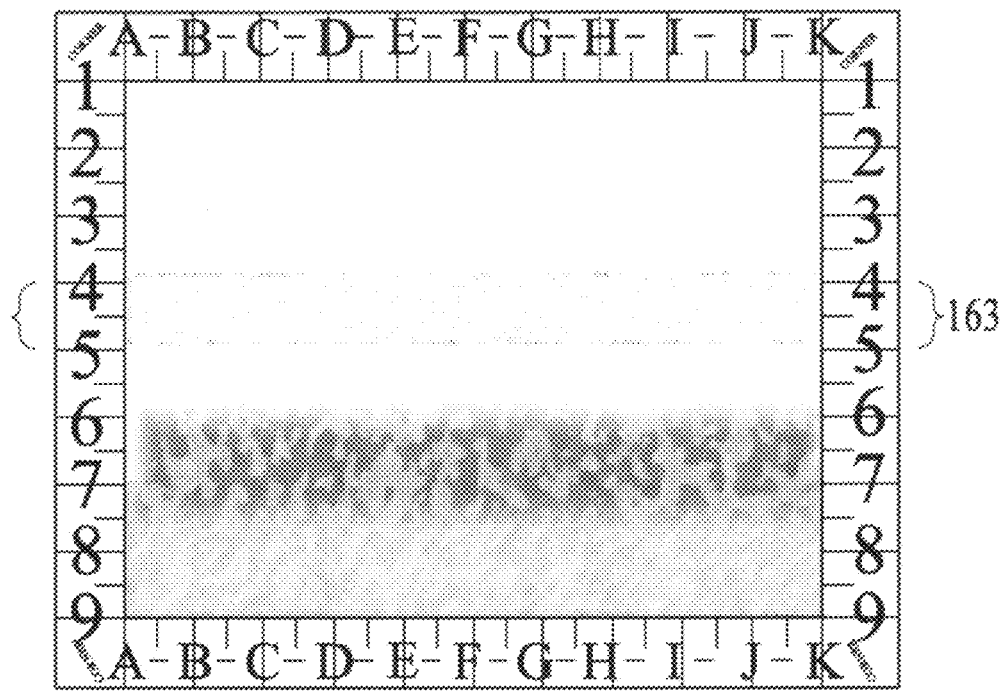

FIG. 5C illustrates an exemplary third step in underpainting. The art instructor or instruction manual, for example, provides the directive: paint on a darker color from 4 to 5, skipping 5 to 8; using the number guides to locate the area between 4 and 5 on the canvas (denoted by reference numeral 163).

Figure 5D:
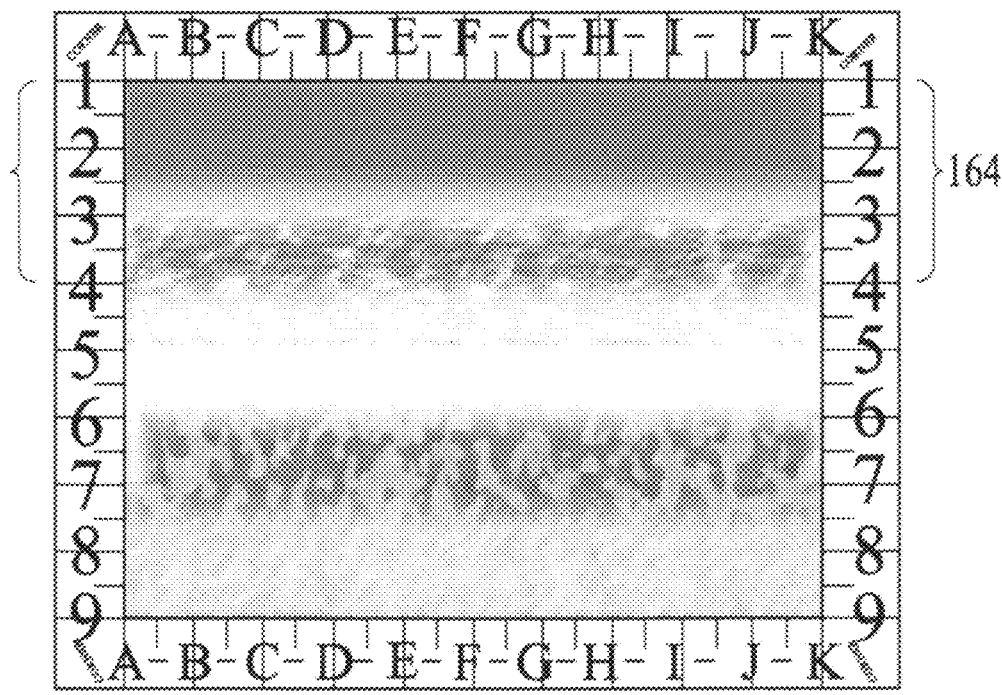

FIG. 5D illustrates an exemplary fourth step in underpainting. The art instructor or instruction manual, for example, provides the directive: paint a darker tone from 1 to 3 and blend remainder of the paint into 4; using the number guides to locate the area between 1 and 4 on the canvas (denoted by reference numeral 164).

Figure 5E:
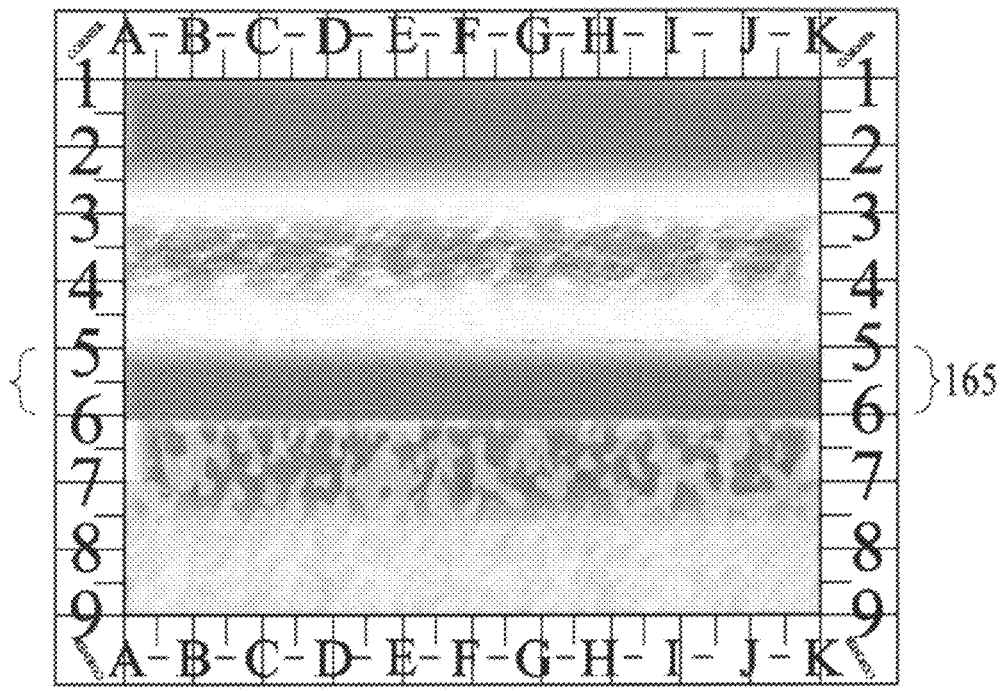

FIG. 5E illustrates an exemplary fifth step in underpainting. The art instructor or instruction manual, for example, provides the directive: paint a different hue between 5 and 6; waiting until the colors below and above was necessary to maintain color integrity by chronological order of colors on the color wheel; using the number guides to locate the area between 5 and 6 on the canvas (denoted by reference numeral 165).

Figure 5F:
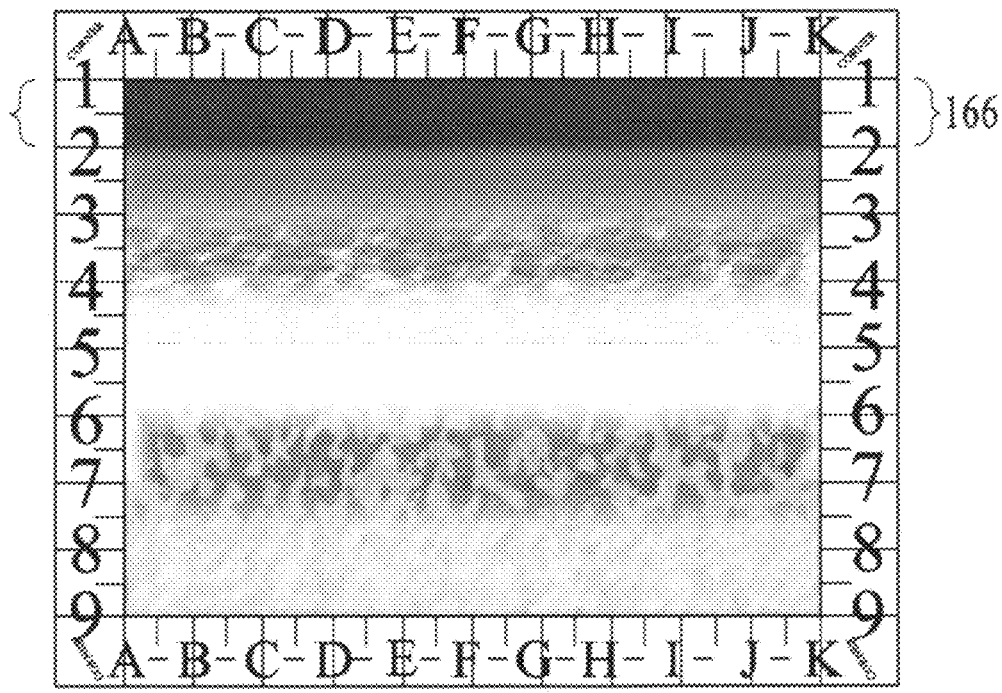

FIG. 5F illustrates an exemplary sixth step in underpainting. The art instructor or instruction manual, for example, provides the directive: lay on darker color horizontally between 1 and 2; the participant would use the number guides to locate the area between 5 and 6 (denoted by reference numeral 166).

Figure 5G:
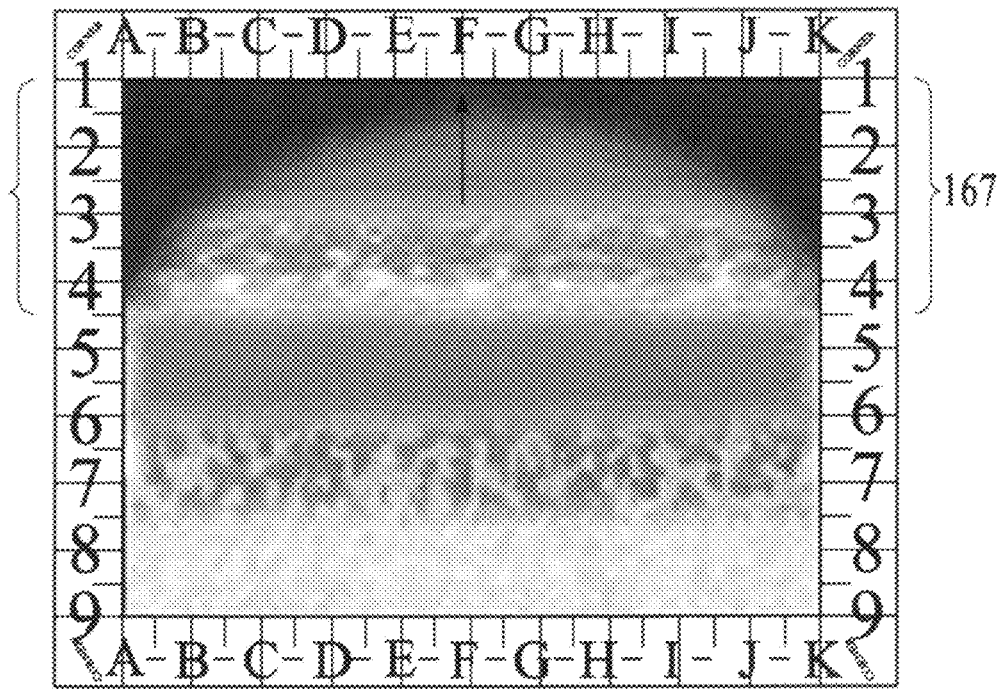

FIG. 5G illustrates an exemplary seventh step in underpainting. The art instructor or instruction manual, for example, provides the directive: lay on the same color from from 4½ to F on both sides rounding the line to create a half circle and blend the edges. The participant would use the number guides to locate the area between 4½ to F (denoted by reference numeral 167).

It is important to note that the foregoing exemplary underpainting is conducted with reference to the border guides, without obstruction in the working area of the canvas or other medium. No physical grids or stencils are used; therefore, no grid lines, squares or reference numbers or marks on the canvas are obscured by the underpainting (e.g., as would be the case for paint-by-numbers, gridded canvas or paper). Such underpainting enables more sophisticated art works, instructed in a straightforward manner, which may conducted in a group setting or individual instruction, as compared for example to paint-by-numbers, etc.

Figure 5H:
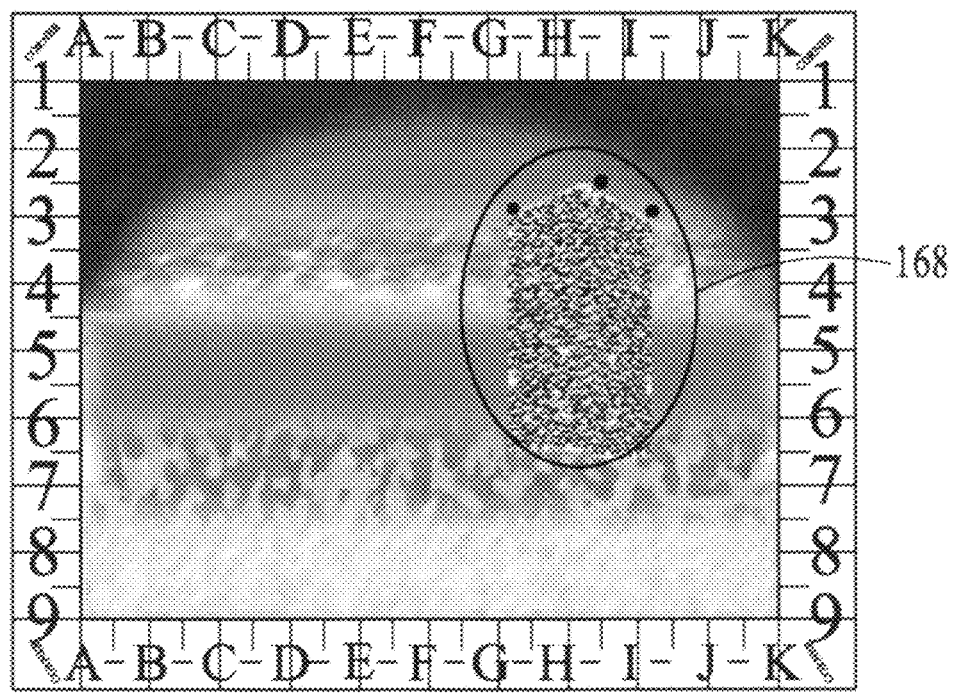
Figure 5I:
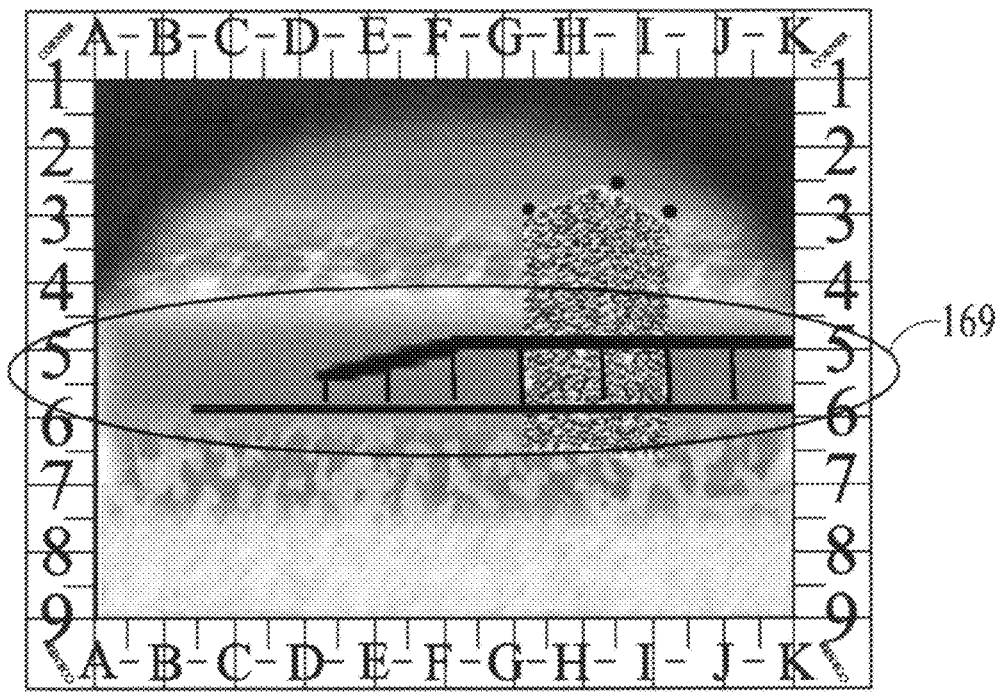
Figure 5J:
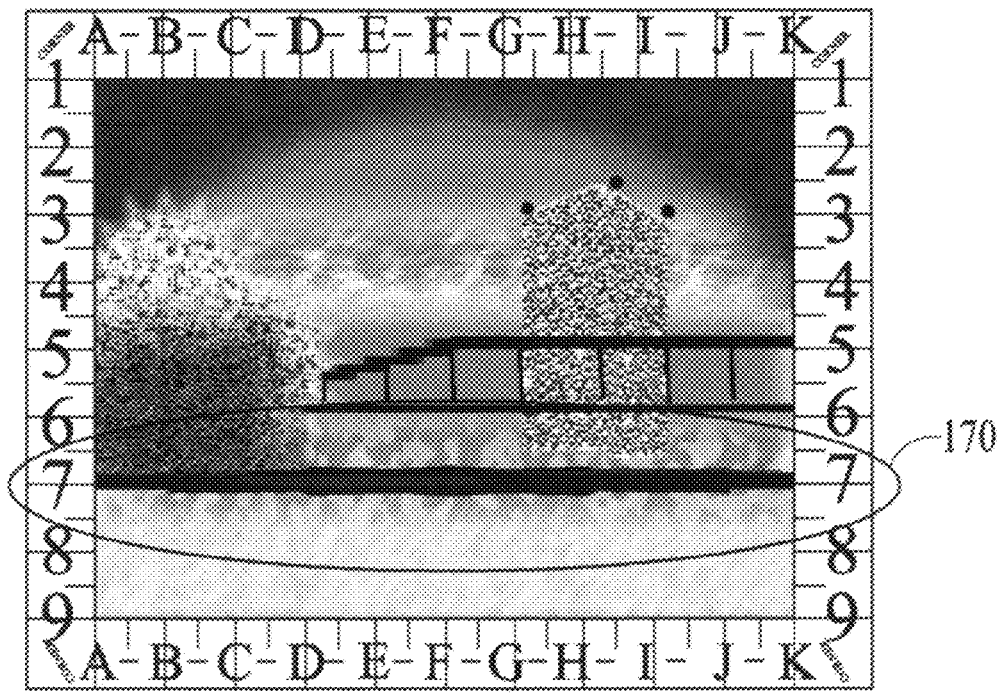

Generally, the next steps in creating a painting includes defining the location and size of images or elements in the painting. FIG. 5H to FIG. 5J illustrate examples of such steps. FIG. 5H as an example illustrates the location of a building. The art instructor or instruction manual, for example, provides the directive: place a dot at G3 and H-I 2½; place the left side of a wide brush at G3 and the right side of the brush at H-I 2½ and paint down to 6½; place a dot at 13; with the left side of the brush at H-I 1½ and the right side of the brush at 13 paint down to 6½. Participants use the guides to locate the three dots and area to be painted (denoted by reference numeral 168).

FIG. 5I illustrates the outline of a bridge. The art instructor or instruction manual, for example, provides the directive: place a dot at D5½ and at F5; join the dots with a line; draw a line from F5 to K5; draw a horizontal line from F6 to K6; draw vertical lines connecting the horizontal lines on 5 and 6 at every letter line—D through K Participants use the guides to locate points and draw lines according to the instructions (denoted by reference numeral 169).

FIG. 5J illustrates the outline of the water shoreline underneath the bridge. The art instructor or instruction manual, for example, provides the directive: draw multiple thin horizontal lines from A7 to K7; dry brush light tone at A4 up to B3 down to D5½ each section paint down to 7; half tones A4½ over to C-D4½ both sections down to 7; deep tone at A5½ to C5½ and paint these sections down to 7. Participants use the guides to locate points, draw lines, and shading according to the instructions (denoted by reference numeral 170).

Figure 5K:
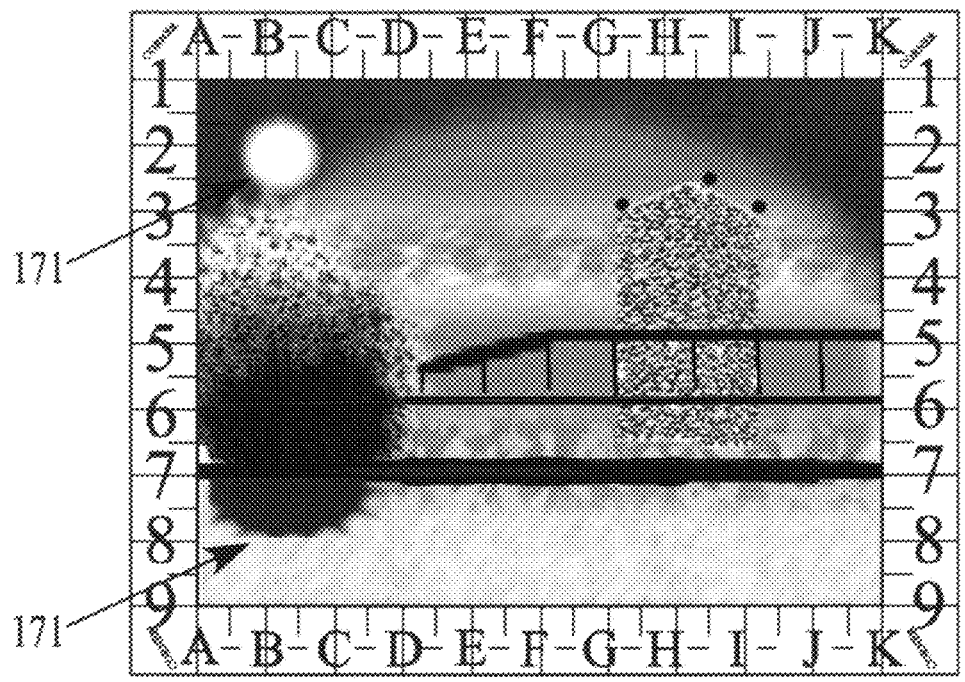
Figure 5L:
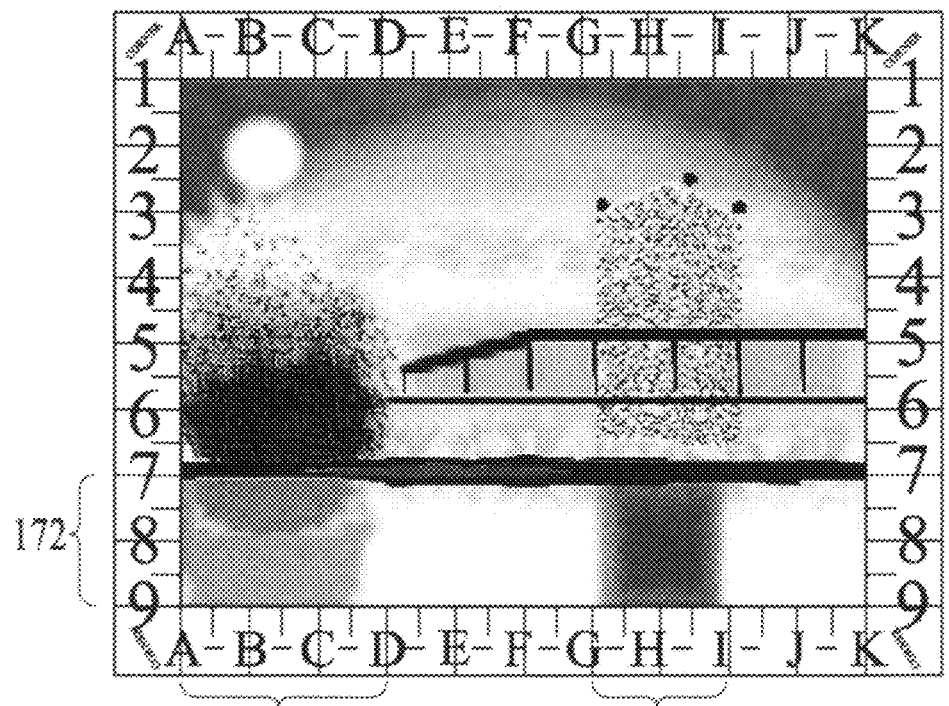
Figure 5M:
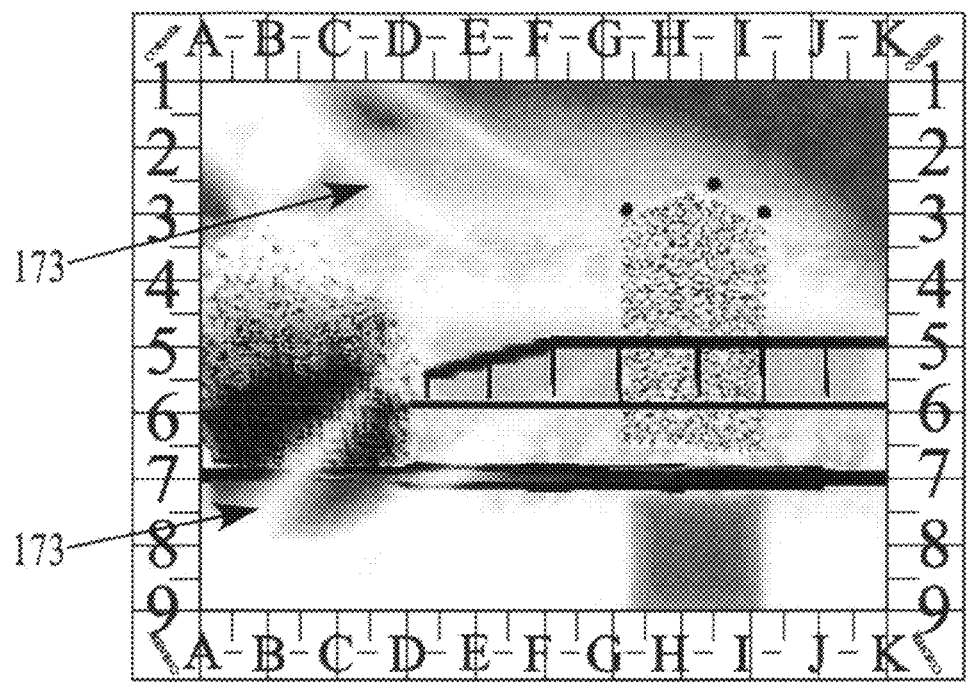
Figure 5N:
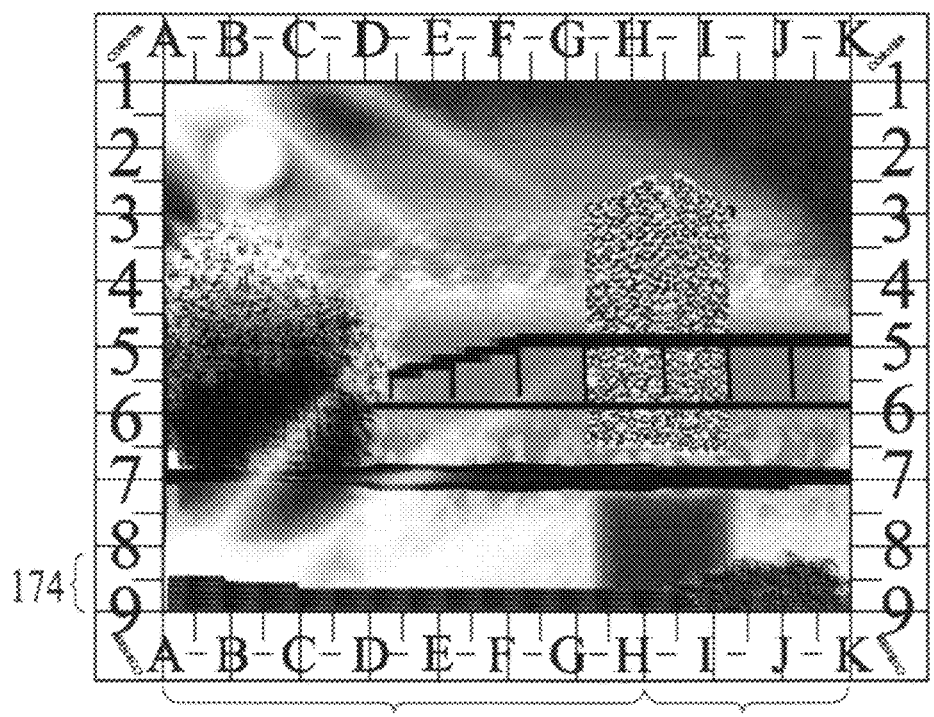

Additional painting techniques advantageously enabled with the present invention include translucent and opaque glazing techniques, as are illustrated by FIG. 5K through FIG. 5M. FIG. 5K illustrates glazing with the exemplary directive: half glaze A7 over to D7 and paint the bottom of a circle, lowest point at B-C8; opaque glaze circle dime size with centered at B2. Participants use the guides to locate areas to be glazed according to the instructions (denoted by reference numeral 171).

FIG. 5L illustrates, for example, glazing that creates the appearance of water underneath the bridge. The art instructor or instruction manual, for example, provides the directive: translucent glaze under 7 to 9 at G, H, I and A, B, C, D. Participants use the guides to locate these areas to be glazed according to the instructions (denoted by reference numeral 172).

FIG. 5M further illustrates, for example, the use of glazing with the directive: three transparent glaze rays starting at A9 and ending at E3, H5, and J5; three more transparent glaze rays starting at A1 ending at B3, E4, and G3. Participants use the guides to create these glazing rays according to the instructions (denoted by reference numeral 173).

FIG. 5N illustrates exemplary the final touches of foreground painting. The art instructor or instruction manual, for example, gives the directive: brick horizontal foreground starting at A8½ and dropping off layers ending at K9; dry brush H8½ to K8½ rounding up in the center at J8; all of the sections go down to 9. Participants use the guides to complete the instructions as provided (denoted by reference numeral 174).

Figure 1D:
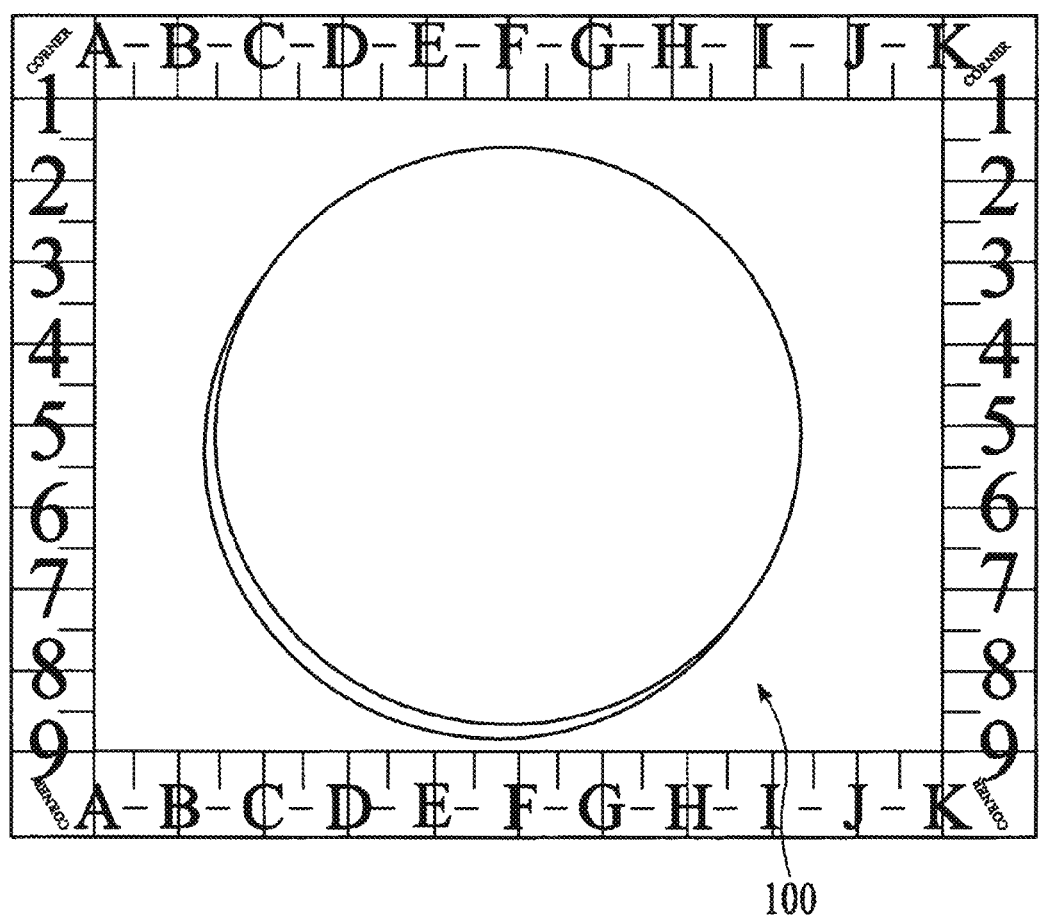

Based on the foregoing, it should be understood that various instructional steps may be provided in order for the participant to create the desired work of art, which may include any number of layers, shapes, images, features, etc. Also, the present invention is not limited to rectangular canvases or other art medium, but may also be applied to other shaped media such as the circular canvas or media illustrated in FIG. 1D.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method of using a border guide system to apply paint or other pigment in an overlapping manner onto a gridless art medium, comprising the steps:

applying the border guide system to surround a working area of the art medium, the working area defined as a planar surface surrounded by a top, bottom, right and left edge, wherein the border guide system comprises top and bottom border guides and right side and left side border guides having positional reference indicia comprising numbers, letters and/or symbols that are affixed to a removable structure that borders the working area of the art medium without obstructing any of the working area, so that no physical grid or stencil is required to be applied to the working area of the art medium in order to apply paint or other pigment to the working area in accordance with predetermined instructions for using the border guide system;

wherein the positional reference indicia on the top border guide lines up and matches the positional reference indicia on the bottom border guide when affixed around the working area of the art medium, and wherein the positional reference indicia on the right border guide lines up and matches the positional reference indicia on the left border guide when affixed around the working area of the art medium;

providing at least a first instruction to apply paint or other pigment to one or more first regions of the working area of the art medium, wherein the first instruction includes a directive to use positional coordinates on at least one of the top and bottom border guides and at least one of the right side and left side border guides to locate a first coordinate of the one or more first regions of the working area of the art medium to which paint or other pigment is to be applied and a directive to use positional coordinates on at least one of the top and bottom border guides and at least one of the right side and left side border guides to locate a second coordinate of the one or more first regions of the working area of the art medium to which paint or other pigment is to be applied;

providing at least a second instruction to apply paint or other pigment to one or more second regions of the working area of the art medium, wherein the second instruction includes a directive to use positional coordinates on at least one of the top and bottom border guides and at least one of the right side and left side border guides to locate a first coordinate of one or more second regions of the working area of the art medium to which paint or other pigment is to be applied and a directive to use positional coordinates on at least one of the top and bottom border guides and at least one of the right side and left side border guides to locate a second coordinate of the one or more second regions of the working area of the art medium to which paint or other pigment is to be applied, such that, in carrying out the first and second instructions, all of the top, bottom, right side and left side border guides are used, regions include the definition of one or more points that are defined by reference to the positional coordinates on the border guides, wherein the first and second regions are at least in part overlapping, wherein paint or other pigment is applied to the art medium in an overlapping manner.

2. The method of claim 1, wherein one or more additional instructions are provided to apply paint or other pigment to one or more additional regions of the working area of the art medium, wherein the one or more additional instructions include a directive to use of one or more of the border guides to locate one or more additional regions of the working area of the medium to which paint or other pigment is to be applied, wherein by reference to the border guides directives are provided to produce a work of art.

3. The method of claim 1, wherein the structure comprises a frame that borders the working area of the art medium.

4. The method of claim 3, wherein the numbers, letters and/or symbols are affixed to the frame by painting, inking, embossing, etching or engraving.

5. The method of claim 4, wherein the top and bottom border guides and the right side and left side border guides are cleanable for re-use.

6. The method of claim 1, wherein the removable structure comprises a roll-dispensed medium on which the numbers, letters and/or symbols are affixed.

7. The method of claim 6, wherein a first roll-dispensed medium provide the top and bottom border guides and a second roll-dispensed medium provide the right side and left side border guides.

8. The method of claim 1, wherein the removable structure comprises a pad-dispensed medium on which the numbers, letters and/or symbols are affixed.

9. The method of claim 8, wherein a first pad-dispensed medium provide the top and bottom border guides and a second pad-dispensed medium provide the right side and left side border guides.

* * * * *